(12) United States Patent
Hebnar et al.

(10) Patent No.: US 12,116,902 B2
(45) Date of Patent: Oct. 15, 2024

(54) TWIN SCROLL TURBINE HOUSING

(71) Applicant: Garrett Transportation I Inc., Torrance, CA (US)

(72) Inventors: Tomas Hebnar, Brno (CZ); Jakub Vymyslicky, Brno (CZ); Michal Planka, Brno (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 17/692,534

(22) Filed: Mar. 11, 2022

(65) Prior Publication Data

US 2023/0287805 A1 Sep. 14, 2023

(51) Int. Cl.
F01D 25/24 (2006.01)
F01D 9/02 (2006.01)
F01D 9/04 (2006.01)

(52) U.S. Cl.
CPC ........... F01D 25/246 (2013.01); F01D 9/026 (2013.01); F01D 9/047 (2013.01); F01D 25/24 (2013.01); F01D 9/045 (2013.01); F01D 9/048 (2013.01)

(58) Field of Classification Search
CPC .......... F01D 9/026; F01D 9/045; F01D 9/047; F01D 9/048; F01D 25/24; F01D 25/246; F02C 6/12; F02B 37/025
See application file for complete search history.

(56) References Cited

U.S. PATENT DOCUMENTS

| 3,383,092 | A | 5/1968 | Cazier | |
|---|---|---|---|---|
| 7,428,814 | B2 | 9/2008 | Pedersen et al. | |
| 8,328,509 | B2 * | 12/2012 | Gee | F01D 25/186 415/231 |
| 8,695,338 | B2 * | 4/2014 | Sato | F02B 37/183 60/602 |
| 8,857,178 | B2 | 10/2014 | O'Hara | |
| 9,845,770 | B2 * | 12/2017 | Martinez-Botas | F02B 33/40 |
| 10,138,803 | B2 * | 11/2018 | Miazgowicz | F02B 37/186 |
| 10,151,237 | B2 * | 12/2018 | McGahey | F16K 3/085 |
| 10,227,889 | B2 * | 3/2019 | Arnold | F02C 6/12 |
| 10,662,870 | B2 * | 5/2020 | Wang | F02B 75/18 |

(Continued)

FOREIGN PATENT DOCUMENTS

| DE | 7 941 A | 10/1954 |
|---|---|---|
| DE | 42 42 494 C1 | 9/1993 |

(Continued)

OTHER PUBLICATIONS

DE-102013213452-A1—Machine Translation (Year: 2015).*

(Continued)

Primary Examiner — Brian P Wolcott

(74) Attorney, Agent, or Firm — BelayIP

(57) ABSTRACT

A turbine assembly can include a turbine housing that defines a longitudinal axis and that includes a first scroll and a first tongue at a first angle about the longitudinal axis and a second scroll and a second tongue at a second angle about the longitudinal axis, where an angular span between the first angle and the second angle is greater than 1 degree and less than 180 degrees; and a first set of vanes and a second set of vanes disposed in the turbine housing, where a vane of the first set of vanes is aligned with the first tongue and a vane of the second set of vanes is aligned with the second tongue.

20 Claims, 13 Drawing Sheets

(56) References Cited

U.S. PATENT DOCUMENTS

| | | | |
|---|---|---|---|
| 11,085,311 B2* | 8/2021 | Eckl | ............ F02B 33/40 |
| 2017/0107896 A1 | 4/2017 | Gugau et al. | |
| 2018/0328281 A1 | 11/2018 | Eckl et al. | |
| 2020/0291800 A1* | 9/2020 | Eckl | ............ F01D 9/047 |
| 2023/0043042 A1* | 2/2023 | Sato | ............ F01D 25/24 |

FOREIGN PATENT DOCUMENTS

| | | | | |
|---|---|---|---|---|
| DE | 10 2007 034235 A1 | | 1/2009 | |
| DE | 102013213452 A1 * | | 1/2015 | ........... F01D 17/143 |
| EP | 2778349 A1 * | | 9/2014 | ............. F01D 9/026 |
| EP | 3 054 121 A1 | | 8/2016 | |
| EP | 3 613 964 A1 | | 2/2020 | |
| EP | 3 708 779 A1 | | 9/2020 | |
| WO | WO-2006123093 A1 * | | 11/2006 | ............ F02B 37/001 |
| WO | WO-2009012989 A1 * | | 1/2009 | ........... F01D 17/105 |

OTHER PUBLICATIONS

WO-2009012989-A1—Machine Translation (Year: 2009).*
EP-2778349-A1—Machine Translation (Year: 2014).*
Extended European Search Report (EESR), Application No. 22203430.8-1004, 10 pages.

* cited by examiner

TWIN SCROLL TURBINE HOUSING

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
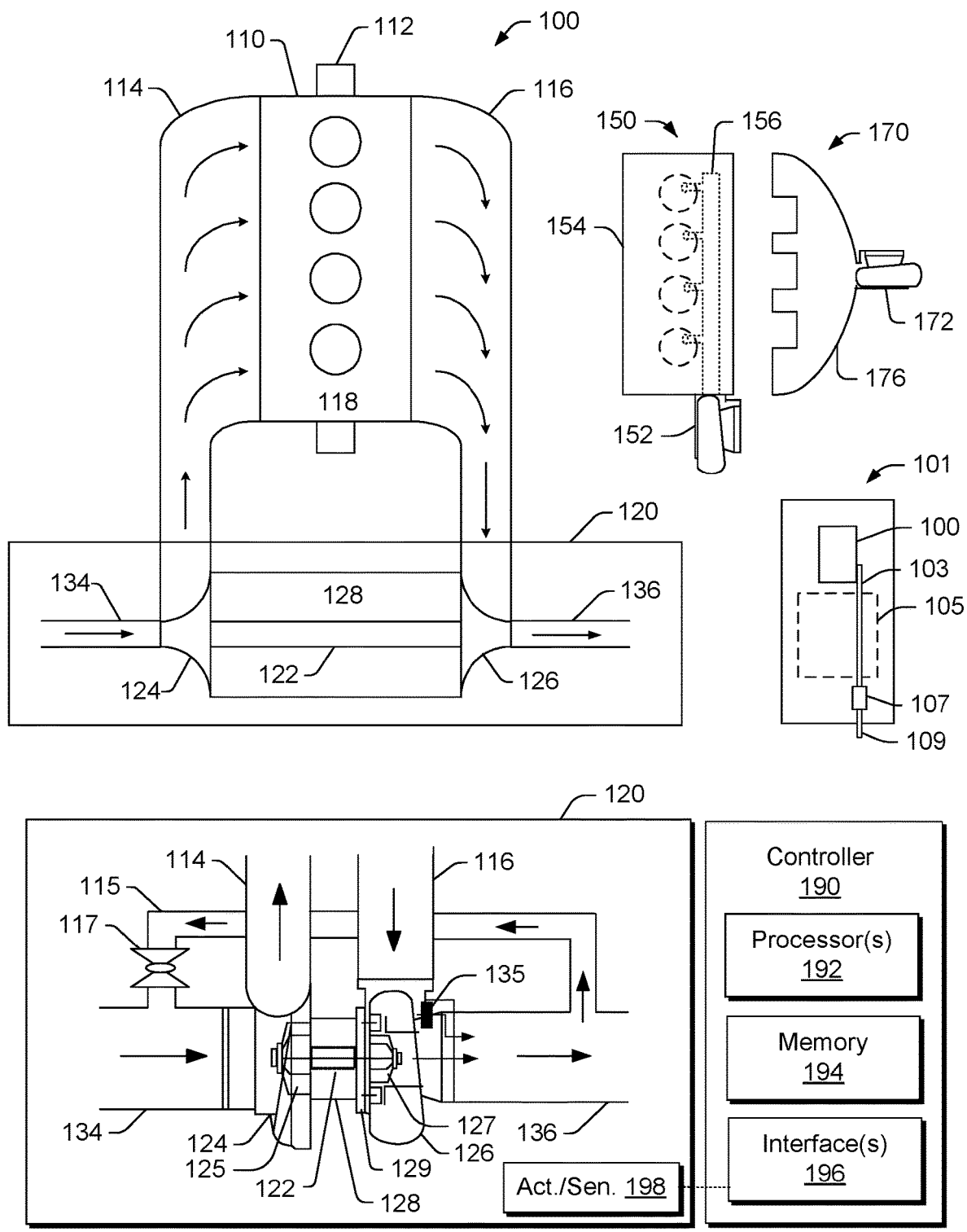
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

An internal combustion engine such as the engine 110 of FIG. 1 may generate exhaust gas with pulsating flow. In so-called constant-pressure turbocharging (e.g., Stauaufladung), an exhaust gas manifold of sufficiently large volume may act to damp out mass flow and pressure pulses such that flow of exhaust gas to a turbine is relatively steady. Another approach, referred to as pulse turbocharging (e.g., Stoßaufladung), may aim to utilize kinetic energy of exhaust gas as it exits cylinder exhaust ports. For example, relatively short, small-cross section conduits may connect each exhaust port to a turbine so that much of the kinetic energy associated with the exhaust blowdown can be utilized. As an example, suitable groupings of different cylinder exhaust ports may organize exhaust gas pulses such that they are sequential, for example, with minimal overlap. In such a manner, exhaust gas flow unsteadiness may be held to an acceptable level. As an example, decisions as to implementation of constant-pressure or pulse turbocharging may depend on one or more factors such as, for example, power demands, efficiency demands, fuel type, number of cylinders, cylinder/stroke volume, engine size, etc.

Figure 2:
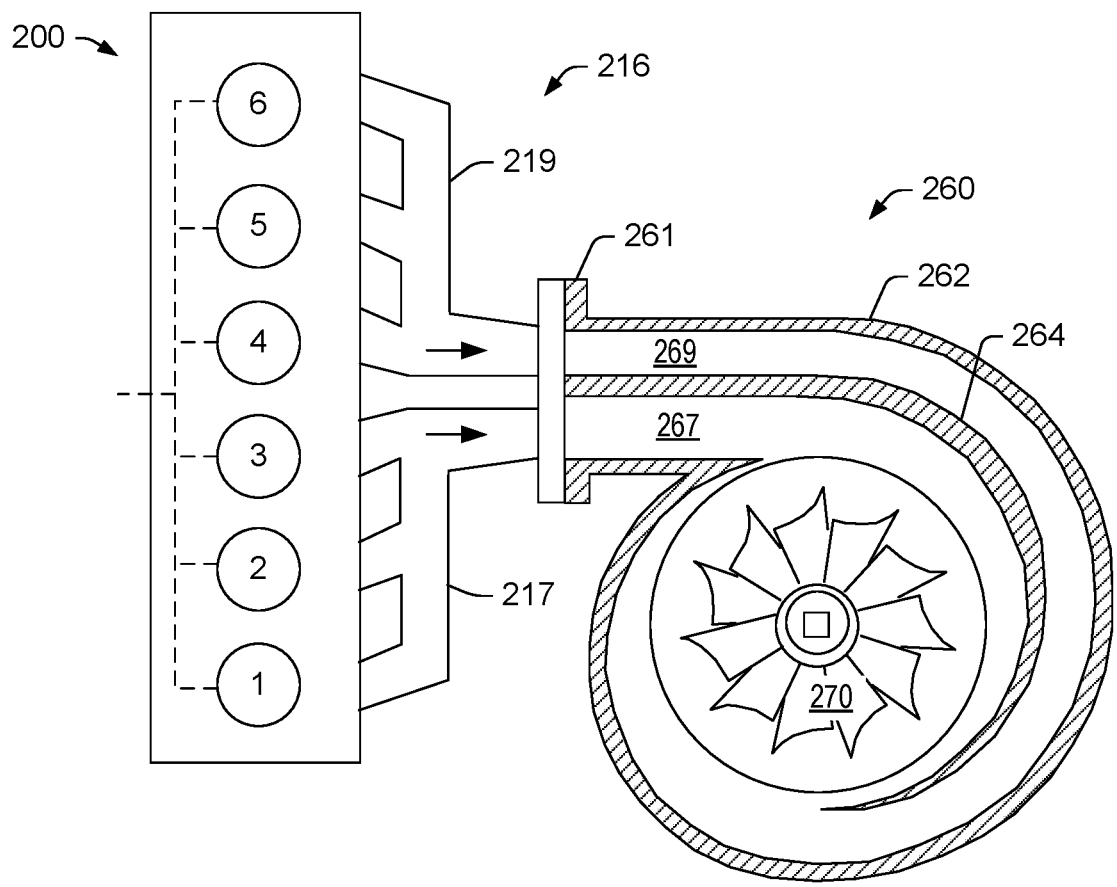
FIG. 2 is a diagram of an example of an internal combustion engine and an example of a turbine assembly.

FIG. 2 shows a diagram of an example of an internal combustion engine 200 and an example of a turbine assembly 260 where a manifold or manifolds 216 provide for fluid communication between cylinders of the internal combustion engine 200 and the turbine assembly 260. In the example of FIG. 2, the internal combustion engine 200 is shown as including an even number of cylinders that are divided into two groups where a first group is in fluid communication with a manifold 217 and where a second group is in fluid communication with a manifold 219. As shown, these manifolds 217 and 219 are exhaust gas manifolds that can receive exhaust gas from the cylinders of the internal combustion engine 200 (e.g., cylinders 1-3 and 4-6, respectively) and direct such exhaust gas streams to passages 267 and 269 of the turbine assembly 260.

In the example of FIG. 2, the turbine assembly 260 includes a flange 261 and walls 262 and 264 that define the passages 267 and 269. As shown, the passages 267 and 269 can be defined as scrolls (e.g., or volutes).

A scroll is a generally spiral passage that can be defined by a housing, which may be referred to as a scroll case. A scroll can direct exhaust gas flow from a single passage such as a pipe to an annular passage, which may be referred to as an annular nozzle. For example, a scroll can direct exhaust gas from a manifold to a periphery of a turbine wheel via an annular nozzle.

A scroll may be characterized by an area over radius ratio (A/R). A/R is defined as the inlet (or, for compressor housings, the discharge) cross-sectional area divided by the radius from a turbine centerline to the centroid of that area. As a scroll decreases in its cross-sectional flow area as it spirals radially inwardly from its inlet to its annular nozzle, both area and radius change. A/R can be selected based on various factors to help assure that, as an internal combustion engine produces exhaust gas that flows through a turbine housing, it propels a turbine wheel in an effective manner. Selection of the appropriate A/R can help to optimize performance. For example, a too small A/R can bottleneck the exhaust gas and loose power, particularly in an upper region of the RPM powerband; whereas, a too large A/R can make a turbine slow to react to changes in exhaust gas flow.

For a twin scroll housing, in general, A/R can be defined as a sum of the inlet area of both scrolls divided by the radius at the inlet. As an example, for a twin scroll housing, A/R may be defined on a per scroll basis or on an overall basis.

Figure 3:
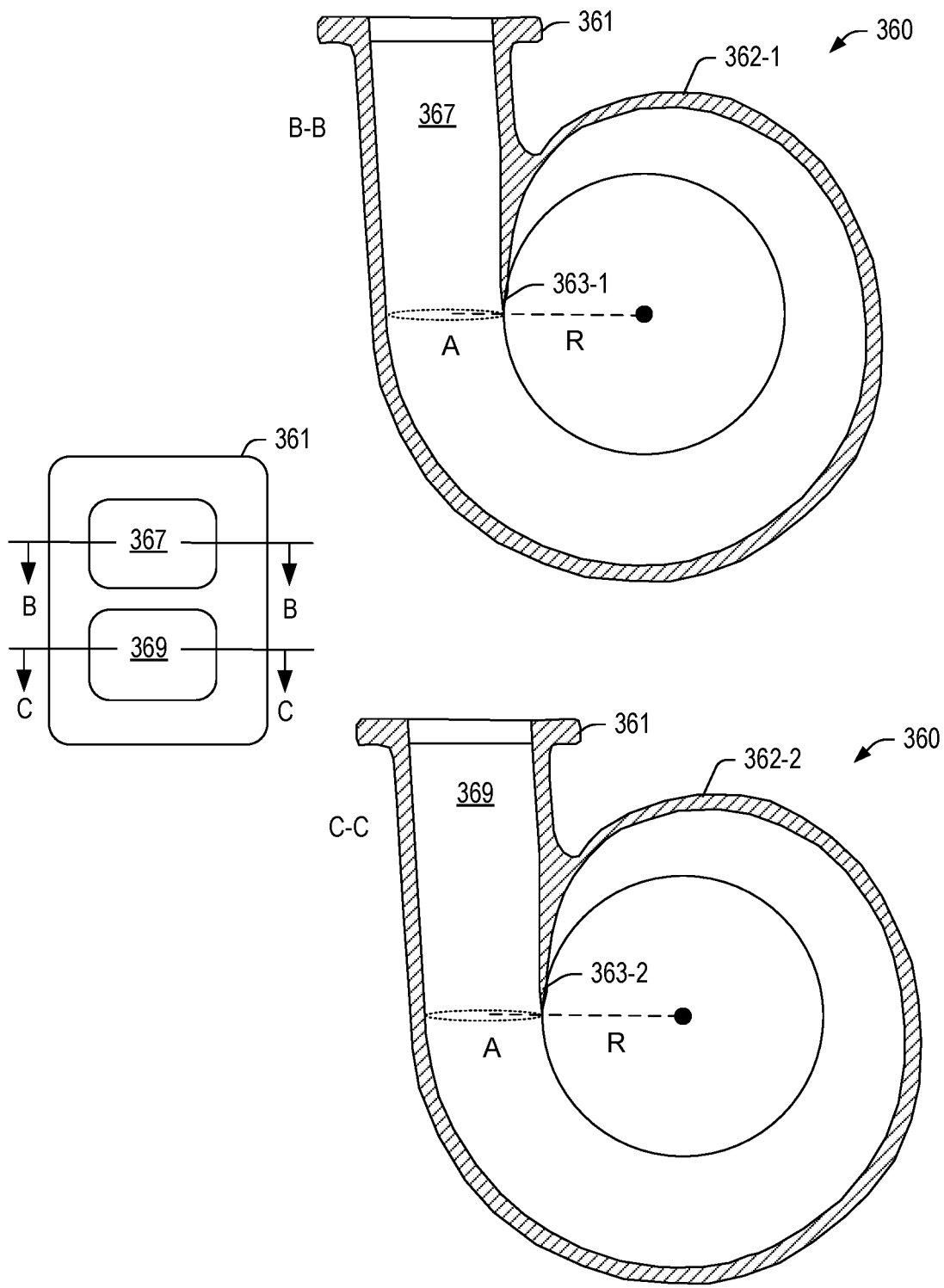
FIG. 3 is a series of views of an example of a portion of a twin scroll turbine assembly.

FIG. 3 is a series of views of an example of a portion of a twin scroll turbine assembly 360. As shown, the twin scroll turbine assembly 360 includes a flange 361 that serves as an intake for exhaust gas into two passages 367 and 369. A cross-sectional view along a line B-B as to the passage 367 shows that a wall 362-1 forms a scroll of the passage 367 that ends at a tongue 363-1 and a cross-sectional view along a line C-C as to the passage 369 shows that a wall 362-2 forms a scroll of the passage 369 that ends at a tongue 363-2. In the example of FIG. 3, the tongues 363-1 and 363-2 coincide. As shown, A/R can be defined for each of the scrolls where their inlets can be defined with respect to respective ends of the tongues 363-1 and 363-2.

Figure 4:
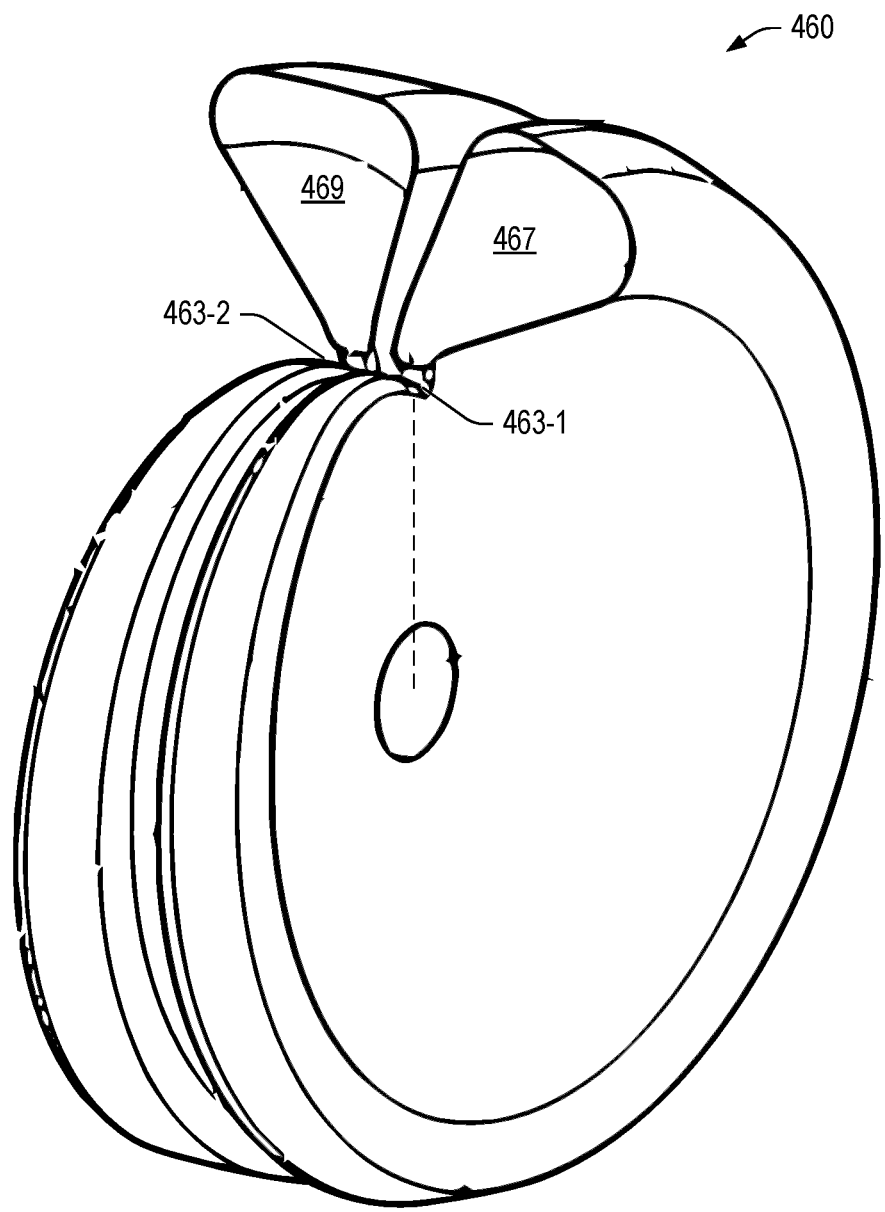
FIG. 4 is a perspective view of an example of a portion of a twin scroll turbine assembly.

FIG. 4 is a perspective view of an example of a portion of a twin scroll turbine assembly 460 where passages 467 and 469 are twin scroll passages that end at tongues 463-1 and 463-2. In such an example, A/R can be determined for each of the scrolls or, overall, for both scrolls.

Figure 5A:
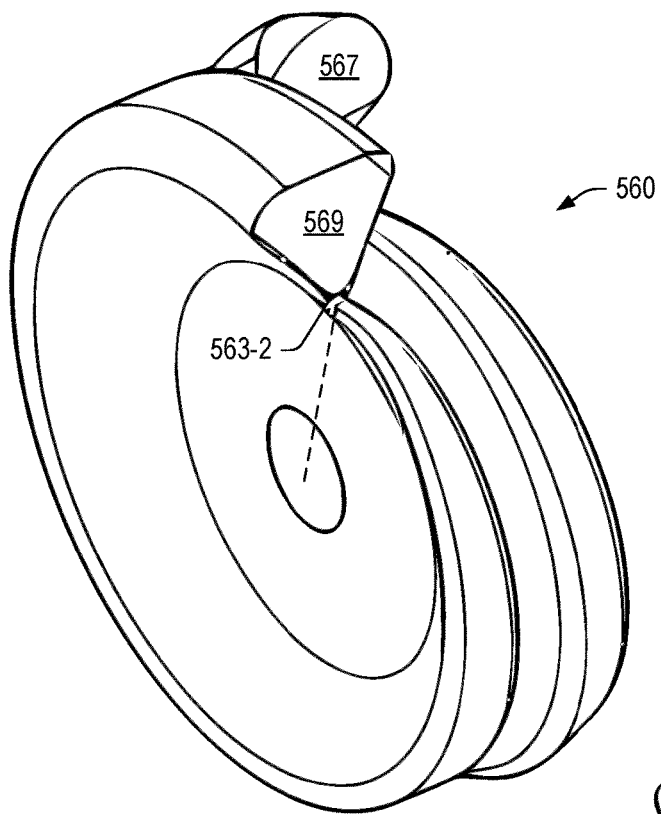
FIGS. 5A and 5B are perspective views of a portion of an example of a twin scroll turbine assembly.
Figure 5B:
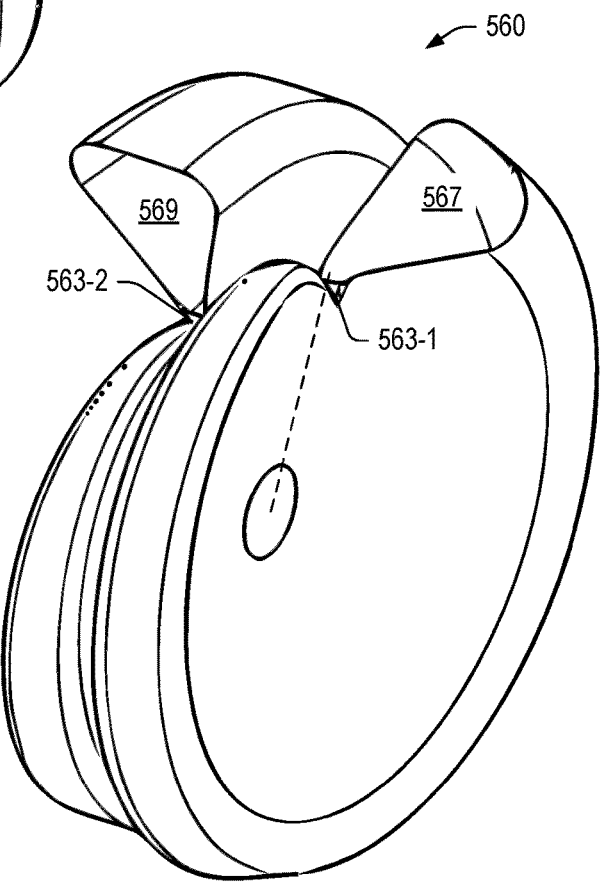

FIGS. 5A and 5B are perspective views of a portion of an example of a twin scroll turbine assembly 560 where passages 567 and 569 are twin scroll passages that at tongues 563-1 and 563-2 that are offset. In such an example, the same radial lines cannot be used to determine A/R for both of the scrolls; rather, two radial lines at different angular positions (e.g., azimuthally about a centerline) can be used to determine A/R for both of the scrolls.

In the example of FIGS. 5A and 5B, the angular offset can be greater than 0 degrees and less than 180 degrees. For example, consider a range of approximately 1 degree to approximately 120 degrees. In such an approach, the angular offset can provide for spatial benefits and/or vane related benefits. For example, as to spatial benefits, consider a turbine assembly that includes a wastegate valve where an angular offset can provide space for branching off exhaust wastegate passages from each of the passages 567 and 569. As to vanes, consider an example where the turbine assembly 560 includes two sets of vanes where the two sets of vanes are angularly offset such that vanes of one set do not align with vanes of the other set.

As to reasons why two sets of vanes may not be aligned, consider reduction of high cycle fatigue (HCF). In such an example, two sets of vanes are not angularly aligned to reduce HCF risk in a manner that can be achieved without compromising performance. As to alignment of a vane with a tongue, such an approach can help to smooth flow from a scroll passage to a turbine wheel space.

As an example, a turbine assembly can include twin scrolls that are angularly offset where two sets of vanes are disposed within the turbine assembly where a vane from one set aligns with a tongue end (e.g., with or without a gap) of one of the twin scrolls and where a vane from the other set aligns with a tongue end of the other of the twin scrolls. In such an approach, exhaust gas flow can be more efficient in flowing from an inlet to an annular nozzle where the vanes define throats in the annular nozzle.

As to the use of vanes, they can help to accelerate exhaust gas flow, which can decrease stage losses in a manner that results in higher efficiency. As explained, a tongue can be aligned with a vane to smooth exhaust gas flow. And, where tongues are offset by a particular angle, vanes from one set of vanes can be offset from vanes of another set of vanes such that high cycle fatigue (HCF) can be reduced.

As an example, a turbine assembly that includes twin scrolls and two sets of vanes can include one or more seals, which may help seal, position and/or secure the sets of vanes. For example, consider utilization of a ring seal, which may be a split ring seal (e.g., a piston ring seal). Such a seal may be at a periphery (e.g., circumference) of two sets of vanes that can facilitate alignment of the two sets of vanes with respective tongues during installation where the seal also provides for sealing alignment between a turbine housing and the two sets of vanes. In such an example, the two sets of vanes can be a first set of fixed vanes of a vane ring or spaced vane rings and a second set of fixed vanes of a vane ring or spaced vane rings. In such an example, the two sets of vanes may be adjustable as to their angular offset, for example, to accommodate one or more twin scroll turbine housings (e.g., with different tongue angular offsets, etc.).

As explained with respect to FIG. 2, exhaust gas can be from different cylinders of an internal combustion engine where the cylinders fire and exhaust at different times, which can lead to exhaust gas pulsations. In such a scenario, pressure in one passage may be less than pressure in another passage at particular points in time. Given such different pressures, if passages are not appropriately sealed, leakage can occur from a higher pressure passage to a lower pressure passage. As an example, a seal such as a ring seal may be utilized to seal an area or areas where vane sets and a turbine housing join. Such an approach can help to reduce risk of inter-passage exhaust gas leakage as may be driven by exhaust gas pulsations. For example, with respect to a 6 cylinder internal combustion engine, a seal can help reduce leakage of exhaust gas from cylinders 1, 2 and 3 in one passage to another passage for cylinders 4, 5 and 6.

As an example, consider 15 vanes in both sets of vanes with 24 degree spacing (3600/15=24°) such that angular offset can be in a range from greater than 0 degrees to less than 24 degrees as, at 24 degrees, vanes from both sets of vanes will match again. This can be repeated by multipliers (e.g., 1st vane vs 3rd vane are going to be arranged and then can rotate vane rings in the range from greater than zero degrees to less than 24 degrees. In such an approach, volute tongues are aligned with respective vanes such that the scrolls (e.g., volutes) have to be angularly displaced as well. Such an approach can provide an opportunity to route a wastegate passage (or wastegate passages) in a different manner than for aligned vanes sets with aligned scroll tongues. As an example, in the aforementioned case of matching 1st and 3rd vanes, scroll tongues may be displaced by from (3*24°) to (3*24°+23.9°).

Figure 6:
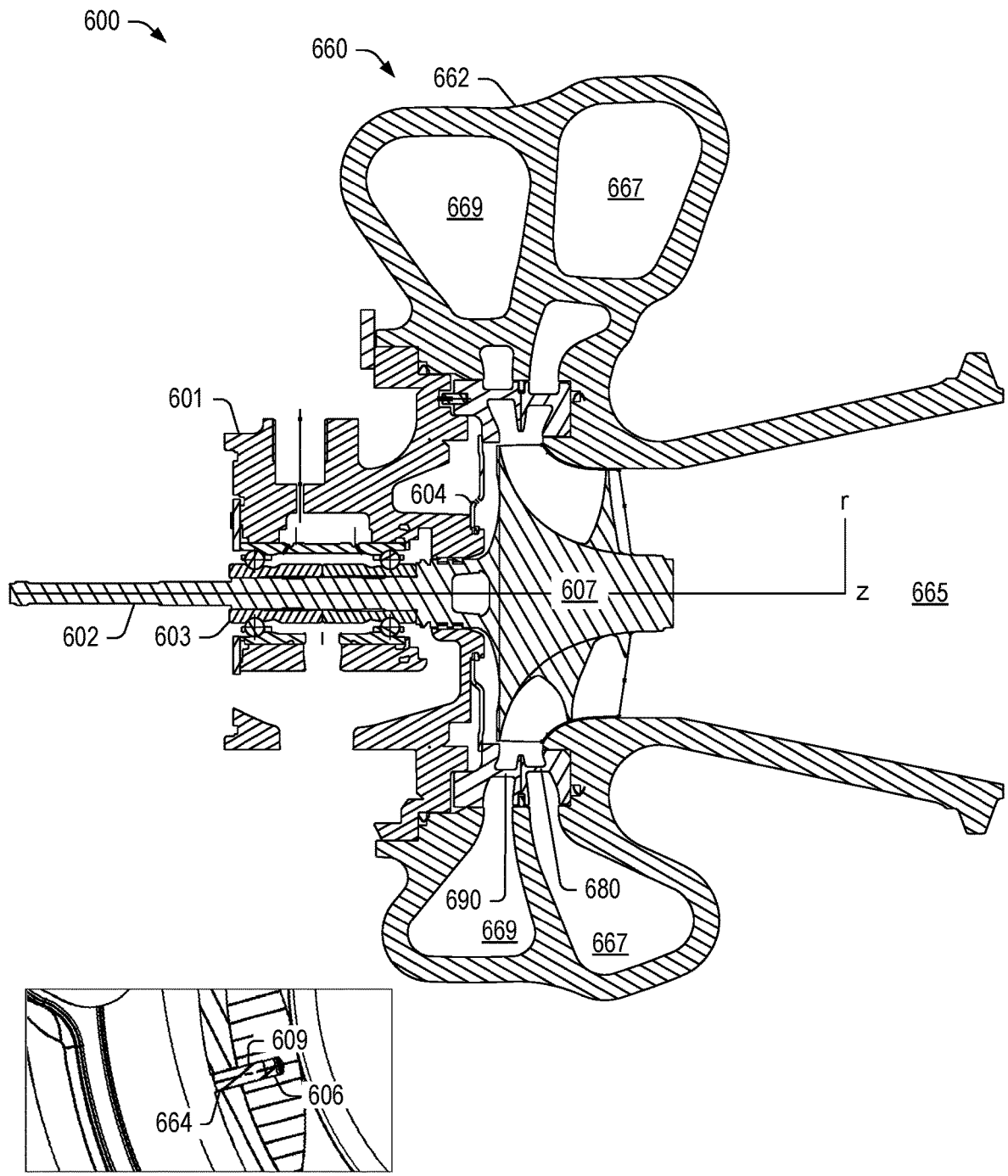
FIG. 6 is a cross-sectional view of a portion of an example of a portion of a turbocharger.

FIG. 6 is a cross-sectional view of a portion of an example of a portion of a turbocharger 600 that includes a center housing 601 (e.g., a bearing housing), a shaft 602, a bearing assembly 603 that rotatably supports the shaft 602 in a through bore of the center housing 601, a heat shield 604 and a turbine wheel 607 that can be part of the shaft 602 to form a shaft and wheel assembly (SWA). For example, the turbine wheel 607 may be welded to the shaft 602 to form a SWA. As shown, the shaft 602 includes a free end where a compressor wheel may be mounted to the free end such that a rotating assembly is formed that includes the turbine wheel 607 and a compressor wheel that are supported by the bearing assembly 603, which may be a rolling element bearing assembly; noting that a journal bearing or multiple bearings and/or bearing assemblies may be utilized.

In the example of FIG. 6, a turbine assembly 660 is coupled to the center housing 601 where the heat shield 604 can perform one or more functions. For example, the heat shield 604 can help to reduce heat transfer from exhaust gas to the center housing 601 and/or the heat shield 604 can be a spring that applies a force that is directed axially outwardly away from the center housing 601 and toward the turbine assembly 660.

As shown in the example of FIG. 6, the turbine assembly 660 can include a turbine housing 662 (e.g., single or multi-piece) that defines passages 667 and 669 as twin scrolls that can direct exhaust gas to a turbine wheel space where such exhaust gas can exit the turbine assembly 660 via an outlet passage 665 defined by the turbine housing 662.

As shown in the example of FIG. 6, the turbine assembly 660 can include two sets of vanes 680 and 690 where the set of vanes 680 defines throats for exhaust gas of the passage 667 and where the set of vanes 690 defines throats for exhaust gas of the passage 669. As mentioned, the heat shield 604 can act as a spring where, in the example of FIG. 6, the heat shield 604 applies a force to the sets of vanes 680 and 690 to push the sets of vanes 680 and 690 against the turbine housing 662. In such an approach, the force can help to reduce leakage, which may be facilitated through the use of seals. For example, consider a compressible seal where the spring force applied by the heat shield 604 can compress a compressible seal such that the compressible seal maintains contact with opposing surfaces to form a suitable seal. As shown in the example of FIG. 6, the heat shield 604 can be an annular disk and function as a disk spring (e.g., akin to a Bellville washer, etc.). For example, the heat shield 604 can contact a surface of the center housing 601 at its inner perimeter and contact a surface of the set of vanes 680 at its outer perimeter. In such an example, the heat shield 604 itself may be compressed (e.g., pre-loaded) upon coupling of the turbine assembly 660 to the center housing 601.

In the example of FIG. 6, exhaust gas can flow in the passages 667 and 669 and through throats of the two sets of vanes 680 and 690 to rotatably drive the turbine wheel 607. As shown, the turbine wheel 607 has blades that include leading edges of an inducer portion of the turbine wheel 607 where the blades also include trailing edges of an exducer portion of the turbine wheel 607. As exhaust gas flows through the throats of the sets of vanes 680 and 690 to the turbine wheel space, the turbine wheel 607 rotates as exhaust flows through the turbine wheel space to the exhaust gas outlet passage 665, which can be in fluid communication with an exhaust gas system (e.g., catalytic converter, silencer/muffler, etc.) that can include an outlet at ambient conditions.

FIG. 6 also shows another cross-sectional view of a portion of the turbocharger 600 where an anti-rotation mechanism includes a pinhole 606 in the center housing 601, a pinhole 664 in the turbine housing 662 and a pin 609 that is disposed in part in the pinhole 606 and disposed in part in the pinhole 664. As shown, a portion of the turbine housing 662 can cover a portion of the center housing 601 where the pin 609 can be inserted from an exterior of the turbine housing 662 through the pinhole 664 to enter the pinhole 606 of the center housing 601. In such an example, the rotational positions of the center housing 601 and the turbine housing 662 can be fixed with respect to one another, which can provide for appropriate alignment of the sets of vanes 680 and 690. In particular, such an anti-rotation feature can help to assure that the set of vanes 690 include a vane that is properly aligned with a tongue of a corresponding scroll.

Figure 7A:
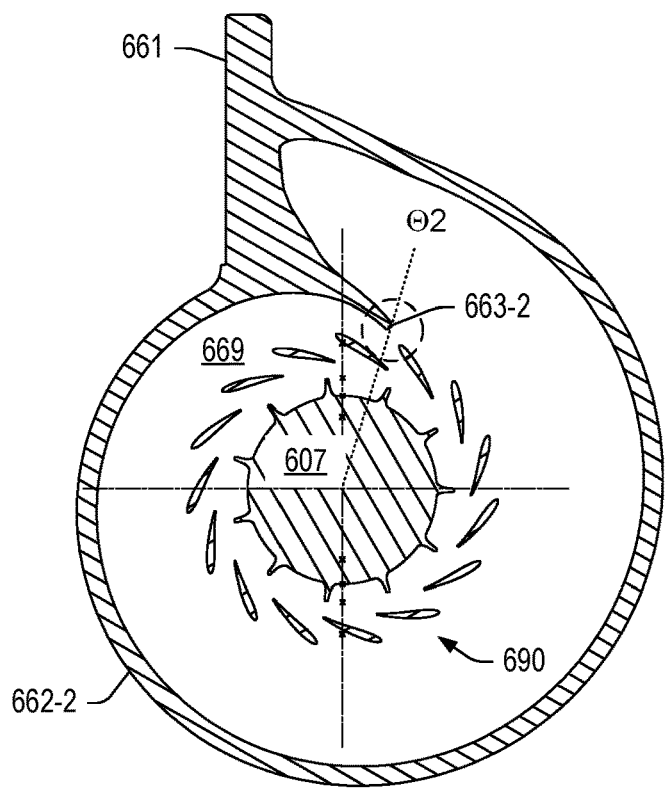
FIGS. 7A and 7B are cross-sectional views of examples of portions of a twin scroll turbine assembly.
Figure 7B:
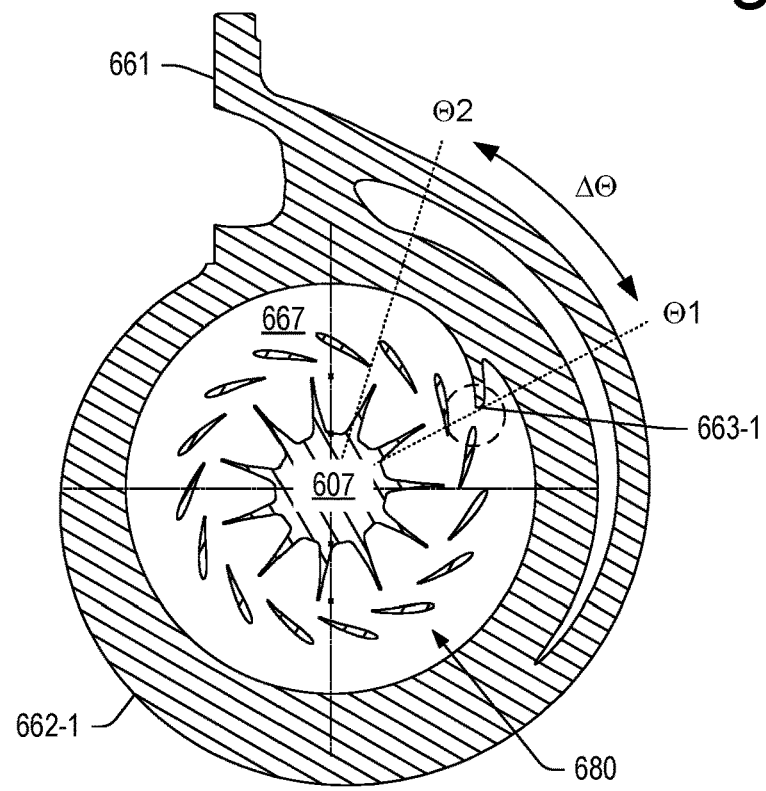

FIGS. 7A and 7B are cross-sectional views of examples of portions of a twin scroll turbine assembly 660. As shown, the turbine housing 662 can include a flange 661, a first wall portion 662-1 that can define a tongue 663-1 for the passage 667 (see FIG. 7B) and a second wall portion 662-2 that can define a tongue 663-2 for the passage 669 (see FIG. 7A). As shown in FIGS. 7A and 7B, the view of FIG. 7B is axially further away from the center housing 601 than the view of FIG. 7A (see, e.g., cross-sectional shape and area of the turbine wheel 607).

As shown in FIGS. 7A and 7B, the set of vanes 680 is not aligned with the set of vanes 690 in that their angular positions about a central axis (e.g., rotational axis of the turbine wheel 607) differ. In particular, the set of vanes 680 includes a vane that is aligned with the tongue 663-1 and the set of vanes 690 includes a vane that is aligned with the tongue 663-2, which as mentioned, the tongues 663-1 and 663-2 can be angularly offset from each other.

In the examples of FIG. 7A and FIG. 7B, angles Θ1 and Θ2 are shown as representing a position of the tongue 663-1 and a position of the tongue 663-2, respectively, along with ΔΘ as an angular offset or angular span between the tongues 663-1 and 663-2. In such an example, a rotational axis of the turbine wheel 607 can be utilized as a z-axis of a cylindrical coordinate system (z, r and Θ) and/or the flange 661 may be utilized as a reference, which may be a common flange for the passages 667 and 669 (see, e.g., FIG. 11), or one or more other features, coordinates, etc., may be utilized as a reference or references. As shown, the angular offset ΔΘ can be determined in a relative manner with respect to the tongues 663-1 and 663-2. In the examples of FIGS. 7A and 7B, the angular offset is approximately 45 degrees. As an example, the angles Θ1 and Θ2 may be utilized to determine an A/R value for each of the scroll passages 667 and 669.

As an example, the set of vanes 690 may be located with respect to a center housing and the set of vanes 680 may be located with respect to a turbine housing such that the set of vanes 690 rotate when the center housing is rotated and the set of vanes 680 rotate when the turbine housing is rotated. In such an example, where the turbine housing 662 is rotated, only the set of vanes 680 will rotate, where rotation of the turbine housing 662 may cause misalignment of a vane of the set of vanes 690 with the tongue 663-2 of the turbine housing 662. As explained, an anti-rotation mechanism between a turbine housing and a center housing can act to maintain proper alignment of a vane with a tongue. As an example, one or more other approaches to locating a set of vanes or sets of vanes may be utilized, where assembly and operation are not impeded.

Figure 8A:
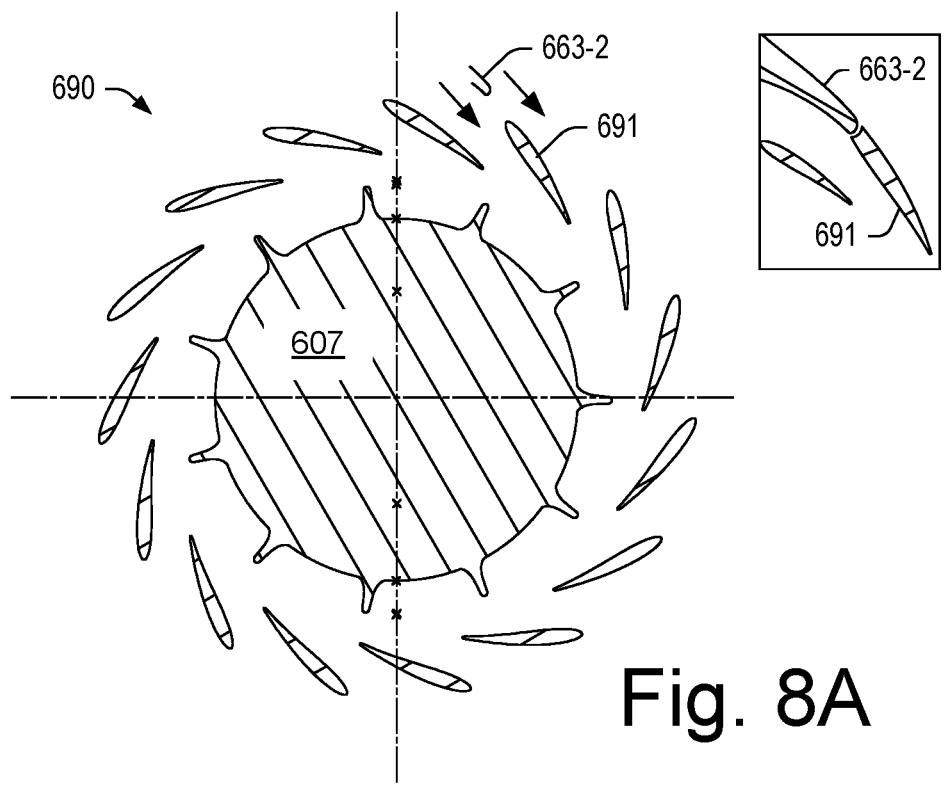
FIGS. 8A and 8B are cross-sectional views of examples of portions of a twin scroll turbine assembly.
Figure 8B:
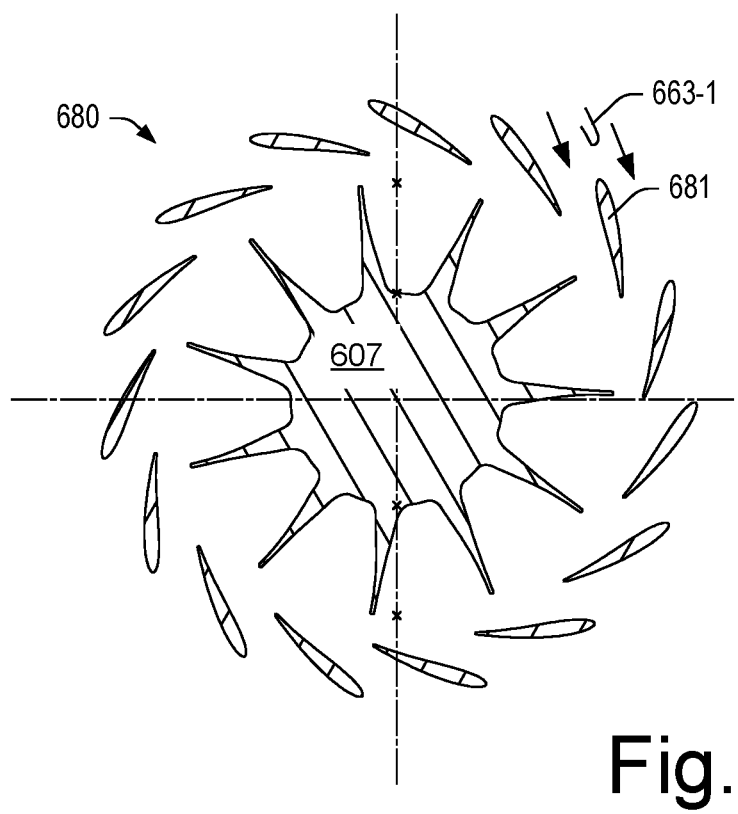

FIGS. 8A and 8B are cross-sectional views of examples of portions of the twin scroll turbine assembly 660. In particular, in FIG. 8A, a vane 691 is shown as being aligned with the tongue 663-2 and, in FIG. 8B, a vane 681 is shown as being aligned with the tongue 663-1. In the examples of FIGS. 8A and 8B, the vanes 681 and 691 may be set a distance from their respective tongues 663-1 and 663-2 where a gap between a leading edge of a vane and a trailing edge of a tongue may be in a range from approximately 0 mm to approximately 10 mm, which may depend on size of turbine wheel, etc. As an example, as shown in an inset view, the vane 691 (or the vane 681) can have a greater length than other vanes within the set of vanes 690 (e.g., or the set of vanes 680) such that it extends closer to the tongue 691. As an example, a gap may exist between a vane and a tongue or may not exist between a vane and a tongue (e.g., consider tongue and vane contact or a tongue that extends into a vane space to act effectively as a vane that defines a throat or throats with one or more adjacent vanes).

Figure 9:
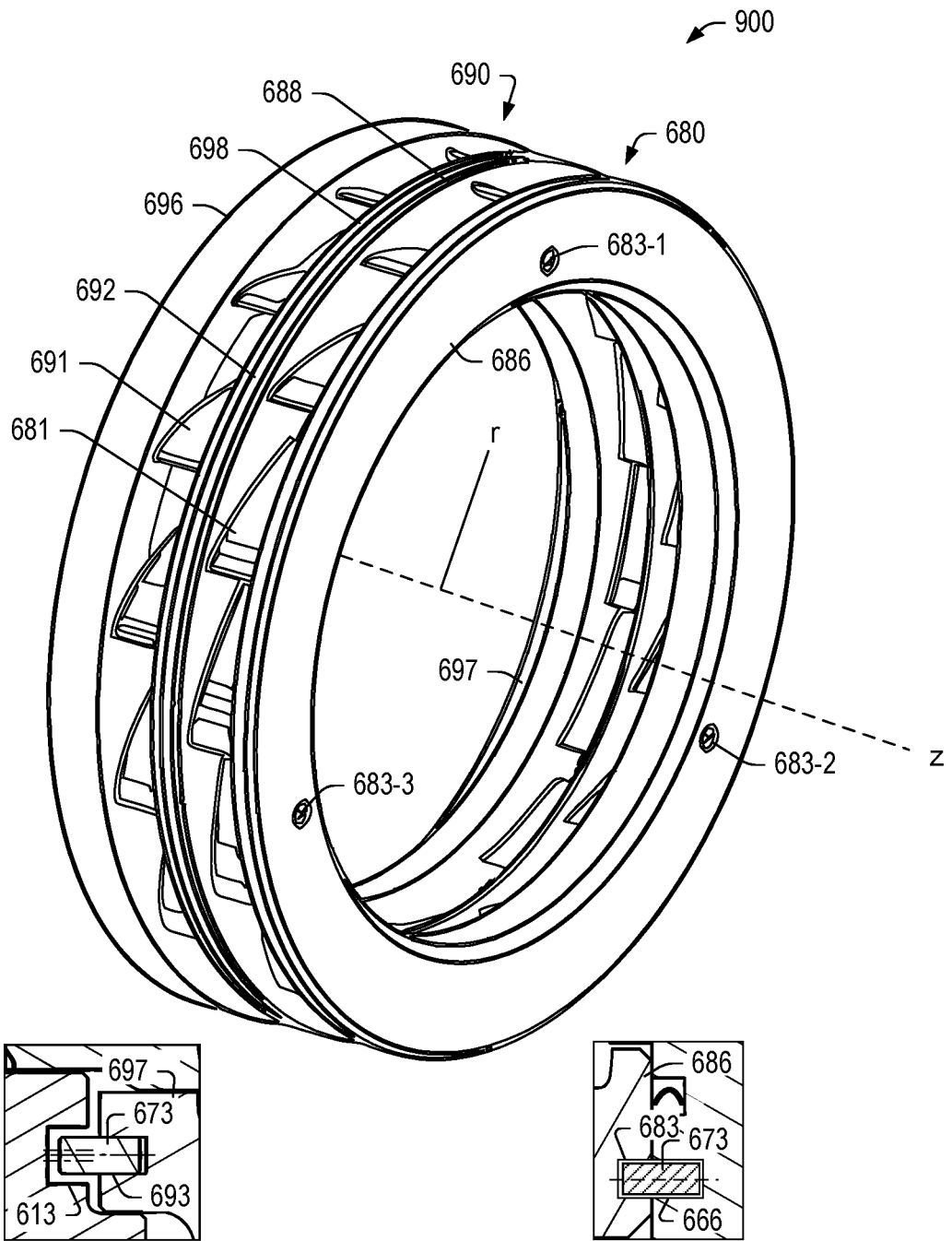
FIG. 9 is a perspective view of an example of a vane assembly.

FIG. 9 is a perspective view of an example of a vane assembly 900 along with coordinates z and r of a cylindrical coordinate system where the vane assembly 900 includes the two sets of vanes 680 and 690 with vanes 681 and 691 labeled, which may be vanes that align with respective tongues (e.g., tongue ends). As shown, the sets of vanes 680 and 690 may be fixedly disposed between rings 686, 688, 696 and 698 where the rings 686, 688, 696 and 698 can include one or more features 683-1, 683-2, 683-3, etc., which may facilitate mounting, positioning, securing, sealing, etc., in a turbine assembly. In the example of FIG. 9, the vane assembly 900 includes a slot 692 that is defined in a space formed at a joint between the sets of vanes 680 and 690. As an example, the slot 692 can be formed by placing the sets of vanes 680 and 690 in contact with each other.

FIG. 9 also shows some examples of pins 673 and pinholes 613, 666, 683 and 693. In such examples, a pin and a pinhole can be utilized to locate a component with respect to another component, which can include locating to limit a change in position such as a rotational position. For example, a pin and a pinhole can be part of an anti-rotation mechanism.

In the example of FIG. 9, the ring 696 of the set of vanes 690 can be stepped such that it includes a stepped portion 697. In such an example, the stepped portion 697 can include one or more locating features such as, for example, one or more pinholes that can receive one or more corresponding pins (e.g., as one or more key and keyway features). For example, as shown in an inset view, the pinhole 693 may be in the ring 696 (e.g., in the stepped portion 697) such as in an axial face of the ring 696 where a center housing includes the pinhole 614 as a corresponding pinhole such that the pin 693 can be seated in part in the pinhole 693 and in part the pinhole 614 of the center housing. As shown in another inset view of the example of FIG. 9, the pinhole 683 can be in the ring 686 (e.g., an axial face of the ring 686) where a turbine housing can include the pinhole 666 as a corresponding pinhole such that the pin 673 can be received in part in the pinhole 683 and in part in the pinhole 666 of the turbine housing.

Figure 10:
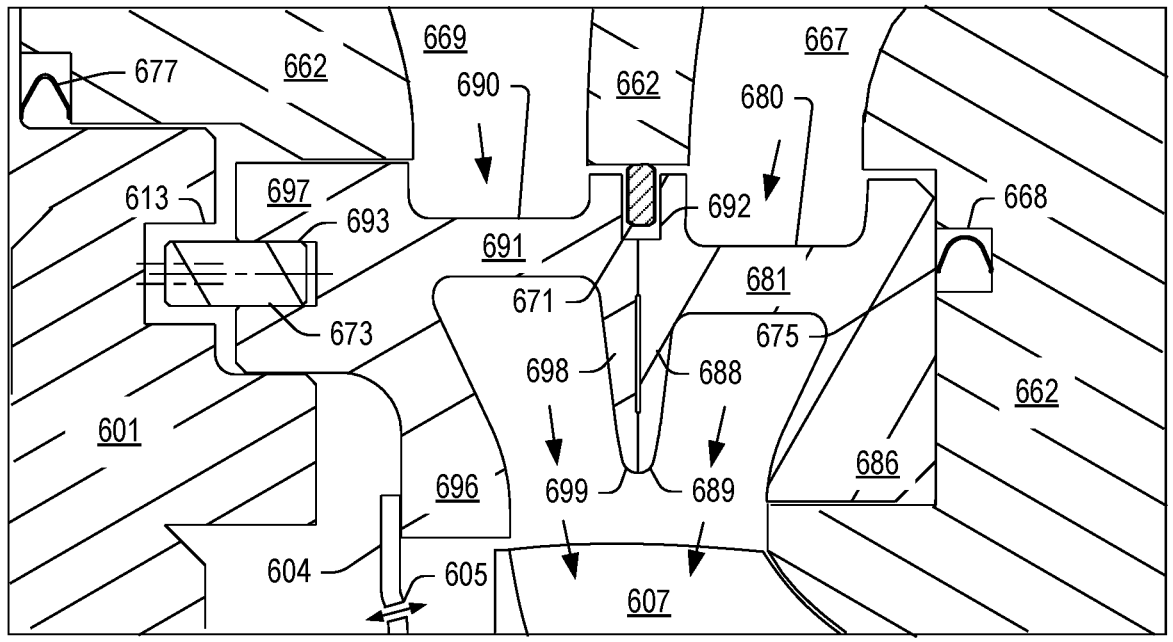
FIG. 10 is a cross-sectional view of a portion of the turbocharger of FIG. 6.
Figure 10:
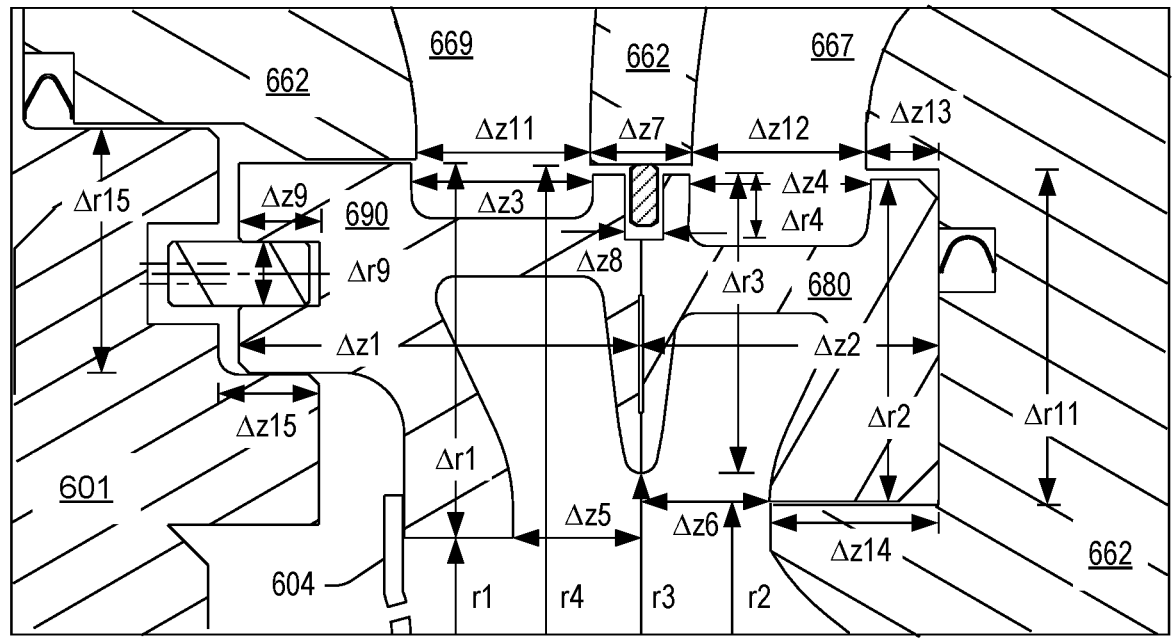

FIG. 10 is a cross-sectional view of a portion of the turbocharger 600 of FIG. 6 where the turbine wheel 607 is disposed in a turbine wheel space defined at least in part by the turbine housing 662, which can seat the sets of vanes 680 and 690 and couple to the center housing 601 such that the sets of vanes 680 and 690 are disposed between the turbine housing 662 and the center housing 601.

As shown in FIG. 10, the turbine housing 662 can include a divider wall portion that divides the passage 667 from the passage 669. As explained, a seal 671 can be utilized to hinder leakage between the passages 667 and 669, which may be driven by exhaust gas pulsations. Further, as shown in the example of FIG. 10, the seal 671 may be symmetric such that one or both of the sets of vanes 680 and 690 can be rotatable, for example, during assembly. In such an approach, a pin or pins 673 (see, e.g., various examples of FIG. 9) may be utilized to secure one or both of the sets of vanes 680 and 690 in a desired angular orientation for appropriate vane-to-tongue alignment. For example, consider one or more instances of the pinhole 693 as being in the stepped portion 697 of the ring 696 where the one or more instances of the pinhole 693 can receive a portion of one or more instances of the pin 673, where another portion of each instance of the pin 673 can be received in a corresponding instance of the pinhole 613 of the center housing 601.

In the example of FIG. 10, another seal 675 is shown, which may be utilized to hinder leakage in instances where the heat shield 604 flexes (e.g., responsive to heat, forces, etc.). In such an example, the seal 675 can be seated in a groove 668 of the turbine housing 662. As an example, the set of vanes 680 may include such a groove, alternatively or additionally, where the seal 675 can be seated at least in part therein.

In the example of FIG. 10, the heat shield 604 is shown as including an opening 605 such that exhaust gas may pass from one side of the heat shield 604 to another side and vice-versa. To further hinder leakage of exhaust gas, a seal 677 can be utilized at an interface between the center housing 601 and the turbine housing 662. As mentioned, one or more seals may be compressible, which may be compressible in one or more directions (e.g., axially, radially, etc.). As explained, the seal 671 may be a seal ring such as a split ring seal. As an example, a split seal ring may be configured akin to a piston ring, which may provide for radial compression and expansion. For example, the seal 671 may be positioned in the slot 692 defined by the sets of vanes 680 and 690 and apply a radially outwardly biasing force such that contact with a surface of the divider wall portion is assured to hinder inter-passage exhaust gas leakage.

As an example, to reduce leakage that would decrease level of turbine stage performance, the seal 671 can seal an area between a surface of a turbine housing divider wall and a surface of sets of vanes. In the example of FIG. 10, each set of vanes may contact the other via a metal-to-metal contact (e.g., over a ring-to-ring contact area, etc.). Such contact may be maintained, for example, through use of the heat shield 604. As an example, the seal 675 and/or the seal 677 can be C-seals, that can be compressible where each can be seated in an appropriate groove or grooves.

As to the pin 673 and the pinhole 693, such key-keyway interaction can help to hinder rotation of a set of vanes or sets of vanes such that vane-to-tongue alignment is assured. For example, the pin 673 and the pinhole 693 can be anti-rotation features that such that angular position is secured. While the example of FIG. 10 shows the pin 673 and the pinhole 693 as being an anti-rotation features for the set of vanes 690, the turbine assembly 660 can include one or more instances of pins and/or pinholes for the set of vanes 680 (see, e.g., various examples of FIG. 9).

In the example of FIG. 10, the angular position of the set of vanes 690 can be set with respect to the center housing 601 while the angular position of the set of vanes 680 can be set with respect to the turbine housing 662. As explained, the heat shield 604 can apply a biasing force against the set of vanes 680 and 690 such that metal-to-metal (e.g., alloy-to-alloy, etc.) contact occurs. As shown, such contact can provide for formation of the slot 692 (e.g., a peripheral slot) that can receive a portion of the seal 671; noting that the sets of vanes 680 and 690 can include inner periphery portions 689 and 699 that join as a divider between their throats. As shown, the portions 689 and 699 may join at a radius that is greater than a minimum radius of the set of vanes 680 and/or the set of vanes 690.

FIG. 10 also shows various dimensions where radii are measured from a rotational axis of a turbine wheel. As show, $r1$ extends to an inner perimeter of the set of vanes 690, $r2$ extends to an inner perimeter of the set of vanes 680, $r3$ extends to a joint between the sets of vanes 680 and 690, and $r4$ extends to the divider portion of the turbine housing 662. Radial dimensions, as measured between two radii, include $\Delta r1$ as a radial thickness of the set of vanes 690, $\Delta r2$ as a radial thickness of the set of vanes 680, $\Delta r3$ as a radial distance between an inner perimeter and an outer perimeter of the joint between the sets of vanes 680 and 690, $\Delta r4$ as a radial depth of the slot 692 for the seal 671 (e.g., seal component) and $\Delta r9$ as a radial distance of the pinhole 693 (e.g., a pinhole diameter). Axial dimensions, a measured between two axial positions, include $\Delta z1$ as an axial thickness of the set of vanes 690, $\Delta z2$ as an axial thickness of the set of vanes 680, $\Delta z3$ as an axial throat dimension of the set of vanes 690, $\Delta z4$ as an axial throat dimension of the set of vanes 680, $\Delta z5$ as an axial throat dimension of the set of vanes 690, $\Delta z6$ as an axial throat dimension of the set of vanes 680, $\Delta z7$ as an axial throat dimension of the divider portion of the turbine housing 662, $\Delta z8$ as an axial dimension of the slot 692, and $\Delta z9$ as an axial dimension of the pinhole 693 where the pin 673 is axially longer than the pinhole 693 is axially deep.

As shown in FIG. 10, a gap exists between the sets of vanes 680 and 690 and the divider portion of the turbine housing 662 where the gap can be defined by $r4$ and $r1$ and $\Delta r1$, $r2$ and $\Delta r2$, etc. As shown, the seal 671 can be disposed at least in part in the slot 692 and contact a surface at an inner perimeter of the divider portion of the turbine housing 662. As explained, such an approach can allow for some expansion and contraction of the sets of vanes 680 and 690 and/or the turbine housing 662 while hindering flow of exhaust gas between the scrolls 667 and 669. As an example, the seal 671 can be sprung to increase the contact force and to maintain an appropriate seal. Spring force may be provided by stiffness of a seal ring and/or by a separate spring behind a seal ring. As explained, a seal ring can be a split ring (e.g., consider a piston ring).

As shown in FIG. 10, the throats of the sets of vanes 680 and 690 converge toward a centerline as defined by the joint between the sets of vanes 680 and 690. As an example, a sum of the dimensions $\Delta z5$ and $\Delta z6$ can be approximately a turbine wheel leading edge blade height of the turbine wheel 607. For example, the sets of vanes 680 and 690 can be utilized to reduce cross-sectional flow area from the passages 667 and 669 (see, e.g., $\Delta z3$ and $\Delta z4$ at approximately $r1$ or $r4$) to a smaller cross-sectional flow area (e.g., at approximately $r1$ or $r2$). As the radius decreases from the outer perimeter to the inner perimeter of the sets of vanes 680 and 690, the flow area also decreases. In such an example, exhaust gas can be accelerated as it flows through throats defined by adjacent vanes toward an inducer portion of a turbine wheel.

In the example of FIG. 10, axial dimensions $\Delta z11$ and $\Delta z12$ are shown for the passages 669 and 667, respectively. As shown, the axial dimension $\Delta z3$ of the set of vanes 690 can be greater than the axial dimension $\Delta z11$ of the turbine housing 662 and the axial dimension $\Delta z4$ of the set of vanes 680 can be greater than the axial dimension $\Delta z12$ of the turbine housing 662. In such an example, exhaust gas flow from the passages 667 and 669 can be free of interference from an edge of a ring or edges of rings of a set of vanes or sets of vanes as such exhaust gas flows to leading edges of the vanes as fixed in the set of vanes 680 and the vanes as fixed in the set of vanes 690. For example, consider criteria $\Delta z11<\Delta z3$ and $\Delta z12<\Delta z4$ in order not to create a step or steps in exhaust gas flow, which would bring additional disturbances in the exhaust gas flow and hence efficiency losses.

As explained, the heat shield 604 can act as a spring that forces the sets of vanes 680 and 690 axially away from the center housing 601. In such an approach, features of the turbine housing (e.g., recess that receives and sets the set of vanes 680) can limit the axial position of the sets of vanes 680 and 690 such that the portion of the set of vanes 690 at r1 does not interfere with a turbine wheel (e.g. backdisk, leading edge of a blade, etc.).

As shown in the example of FIG. 10, the turbine housing 662 can include an annular recess that can seat the set of vanes 680 where the annular recess can include a radial dimension $\Delta r11$ that is equal to or greater than the radial dimension $\Delta r2$ of the set of vanes 680. The annual recess can also include axial dimensions $\Delta z13$ and $\Delta z14$, which can be an inner perimeter axial dimension and an outer perimeter axial dimension of the ring 686 as shown in the example of FIG. 9; noting that the ring 686 may be a unitary ring or a multi-piece ring. As shown, the annular recess and the ring 686 has an axial thickness that is greater at its inner perimeter than at its outer perimeter where the ring 686 can be sloping such that the axial throat dimension $\Delta z6$ is less than the axial dimension $\Delta z4$. As shown, the ring 696 of the set of vanes 690 can also provide for an axial throat dimension $\Delta z5$ that is less than the axial dimension $\Delta z3$. In such an approach, the set of vanes 680 and the set of vanes 690 can direct exhaust gas inwardly in a converging manner toward an inducer portion of the turbine wheel 607 as disposed in the turbine wheel space defined at least in part by the turbine housing 662.

As shown in the example of FIG. 10, the turbine housing 662 can include a wall portion that defines the passage 669 where an inner perimeter surface of the wall portion (e.g., at or approximately at the radius r4) can face and/or contact an outer perimeter surface of the stepped portion 697 of the ring 696. As shown, the stepped portion 697 can be received in part by an annular recess of the center housing 601, which may have an axial dimension $\Delta z15$ and a radial dimension $\Delta r15$. As shown, the axial dimension $\Delta z15$ can be sufficient to allow some movement, expansion, etc., without contact between an axial face of the stepped portion 697 and a bottom of the annular recess; noting, again, that the sets of vanes 680 and 690 can be forcibly biased by the heat shield 604, which may be referred to as a spring. Referring again to FIG. 6, the heat shield 604 is shown as being seated against the center housing 601 at an inner perimeter, optionally with a locking ring, and having a portion at or proximate to an outer perimeter being in contact with the set of vanes 690.

As shown in FIG. 6 and FIG. 10, the sets of vanes 680 and 690 can be limited as to radially inward movement via the annular recesses of the center housing 601 and the turbine housing 662, for example, to prevent movement of the ring 696 radially inwardly in a manner where it could contact a portion of the turbine wheel 607 As shown, a corner of the ring 696 may be aligned with a lower portion of a leading edge of a blade of the turbine wheel 607 where a hub portion of the turbine wheel 607 may be slightly below the corner. As to a shroud edge of a blade of the turbine wheel 607, it may be spaced a relatively small distance from a shroud portion of the turbine housing 662. For example, in FIG. 10, the turbine housing 662 is shown as including an annular flat portion that is between the annular recess for the ring 686 and the shroud portion. In such an arrangement, the inner radius of the ring 686 is greater than the inner radius of the ring 696; noting that the annular flat portion may be shortened or eliminated such that the inner perimeters of the rings 686 and 696 may be approximately equal. As mentioned, the radius r3 can be greater than the radius r1 and/or the radius r2 such that exhaust flow from the passages 667 and 669 can join prior to encountering the inducer portion of the turbine wheel 607, where leading edges of the turbine wheel 607 may be defined by a leading edge radius, which may be less than r1, less than r2 and less than r3.

As explained with respect to FIG. 6, the rotational positions of the center housing 601 and the turbine housing 662 can be fixed with respect to one another (e.g., via an anti-rotation mechanism), which can provide for appropriate alignment of the sets of vanes 680 and 690. For example, as the sets of vanes 680 and 690 are in contact with each other via force applied by the heat shield 604 as a spring optionally without one or more interlocking features between them, if the turbine housing 662 rotates with respect to the center housing 601, the set of vanes 680 can rotate with respect to the set of vanes 690 particularly where pin/pinhole features are provided for the set of vanes 680 as to the turbine housing 662 and the set of vanes 690 as to the center housing 601. As an alternative example, an anti-rotation mechanism (e.g., a locating mechanism) for the set of vanes 690 can be between the turbine housing 662 and the set of vanes 690. For example, consider the pin 673 as being rotated by 90 degrees with corresponding pinholes in the set of vanes 690 and the turbine housing 662 where, for example, clamping of the turbine housing 662 to the center housing 601 may act to lock the pin in place in the pinholes.

As explained, a turbine assembly can include a turbine housing that defines a longitudinal axis and that includes a first scroll and a first tongue at a first angle about the longitudinal axis and a second scroll and a second tongue at a second angle about the longitudinal axis, where an angular span between the first angle and the second angle is greater than 1 degree and less than 180 degrees; and a first set of vanes and a second set of vanes disposed in the turbine housing, where a vane of the first set of vanes is aligned with the first tongue and a vane of the second set of vanes is aligned with the second tongue.

While less than 180 degrees is mentioned, an angular span (e.g., angular offset) can be selected to assure that vanes from a first set of vanes and vanes from a second set of vanes do not align with each other. In such an approach, non-alignment of vanes can help to reduce high cycle fatigue (HCF), which can improve performance and increase longevity of a turbine assembly. As an example, an angular offset or angular span may be determined in part by a number of vanes where intervals can be defined. For example, for 10 vanes, spacing can be approximately 36 degrees between adjacent vanes. As such, one set of vanes may be rotated (e.g., angularly offset) from 1 degree to 35 degrees with respect to another set of vanes, from 37 degrees to 71 degrees, from 109 degrees to 143 degrees, etc. As an example, an angular offset can provide space for routing a wastegate passage from a scroll passage to a wastegate valve in a more compact and/or efficient manner.

As an example, a turbine assembly can include a turbine housing that defines a longitudinal axis and that includes a first scroll and a first tongue at a first angle about the longitudinal axis and a second scroll and a second tongue at a second angle about the longitudinal axis; sets of vanes that include a first set of vanes and a second set of vanes disposed in the turbine housing; and a seal ring disposed between the sets of vanes and the turbine housing, where the seal ring contacts the turbine housing in a space between an outlet of the first scroll and an outlet of the second scroll. In such an example, the first set of vanes and the second set of vanes can be separate units. As an example, a first set of vanes can be adjustable to align one of its vanes with a first tongue of a first scroll of a turbine housing and a second set of vanes can be adjustable to align one of its vanes with a second tongue of a second scroll of a turbine housing. In such an example, the first tongue and the second tongue may be at a common angle as measured from a longitudinal axis of the turbine housing that corresponds to a rotational axis of a turbine wheel or the first tongue and the second tongue may be offset with an angular offset that is, for example, greater than 0 degrees and less than 360 degrees. For example, while sets of vanes as in the example of FIG. 10 may be utilized with offset tongues of a twin scroll turbine housing, they may also be utilized in with aligned tongues of a twin scroll turbine housing. As to number of vanes in a set of vanes, it may be greater than 5 and less than 40 where, for example, one set of vanes may have a number of vanes that is the same or different than another set of vanes. As an example, vane shape and/or size may be the same for two sets of vanes or may differ. As explained, a set of vanes may include a vane that has a different size and/or shape where that vane is to be paired with a tongue of a scroll (see, e.g., the example of FIG. 8A).

Figure 11:
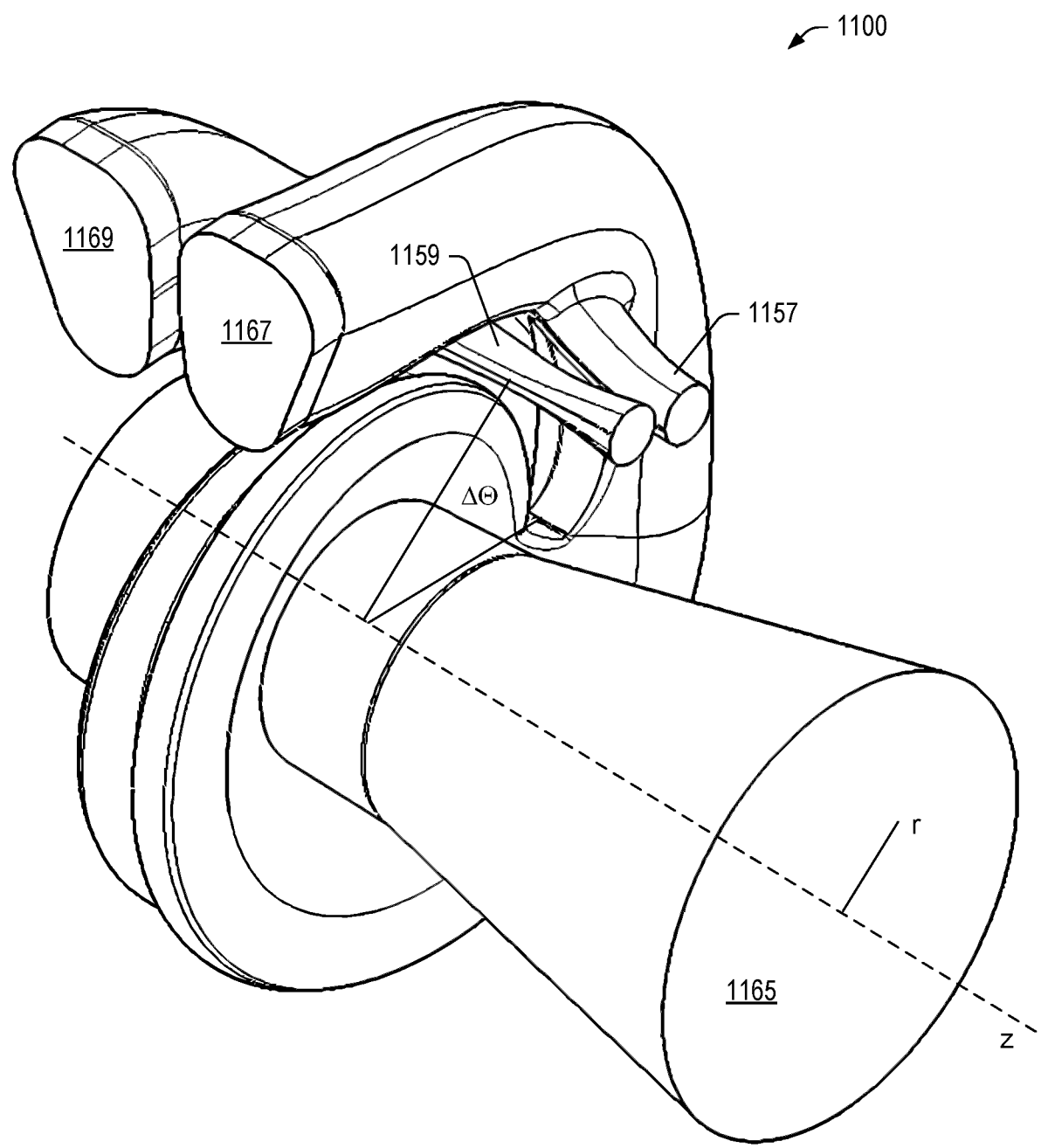
FIG. 11 is a perspective view of examples of flow passages.

FIG. 11 is a perspective view of examples of flow passages 1100 where the flow passages include a wastegate passage 1157 in fluid communication with a scroll passage 1167 and a wastegate passage 1159 in fluid communication with a scroll passage 1169. In such an example, a wastegate valve or wastegate valves may regulate flow from one or both of the scroll passages 1167 and 1169 via the wastegate passages 1157 and 1159 to an outlet passage 1165.

As shown in the example of FIG. 11, the scroll passages 1167 and 1169 have an angular offset such that space is available for the wastegate passage 1159. In the example of FIG. 11, an angular offset ΔΘ is shown in a cylindrical coordinate system (z, r and Θ) where the wastegate passage 1159 extends between the scroll passage 1167 and 1169, which may be at approximately the same angle as the wastegate passage 1157 such that the wastegate passages 1157 and 1159 can run in a substantially parallel and side-by-side manner to a wastegate valve, which may be a single wastegate valve with a single plug that can regulate flow from both of the wastegate passages 1157 and 1159.

Figure 12:
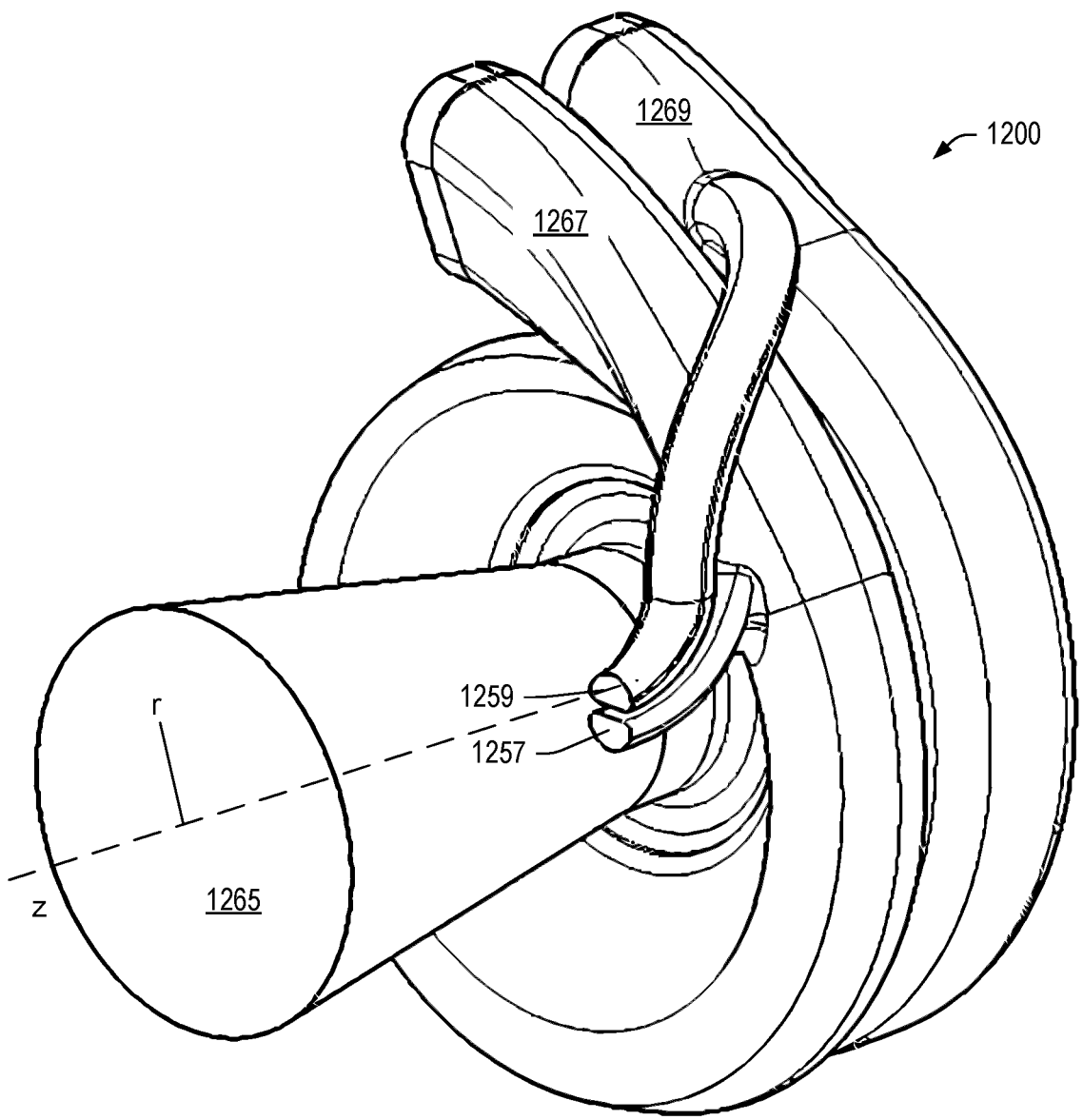
FIG. 12 is a perspective view of examples of flow passages.

FIG. 12 is a perspective view of examples of flow passages 1200 without angular offset of scroll tongues where the flow passages include a wastegate passage 1257 in fluid communication with a scroll passage 1267 and a wastegate passage 1259 in fluid communication with a scroll passage 1269. In such an example, a wastegate valve or wastegate valves may regulate flow from one or both of the scroll passages 1267 and 1269 via the wastegate passages 1257 and 1259 to an outlet passage 1265. However, due to space constraints, the wastegate passage 1259 has an exterior route; whereas, in the example of FIG. 11, the wastegate passage 1159 can have an interior route.

In the example of FIG. 11, due to angular displacement of the scrolls, the wastegate passage can be inside a turbine housing such that the passage is shorter, which can make the turbine design more compact and better for casting. For example, in sand casting, long and thin sand cores are fragile and there is a risk of cracking during a mold pouring process. For example, in FIG. 12, the wastegate passage 1259 is positioned exteriorly to the scroll passages 1267 and 1269 such that a casting process would involve utilization of a relatively long and thin sand core to form the wastegate passage 1259 in a cast turbine housing. In such an approach, the portion of the cast turbine housing that forms the wastegate passage 1259 is not protected as would be the wastegate passage 1159 in the example of FIG. 11. Thus, for a cast turbine housing with the wastegate passage 1259, contact may result in a fracture (e.g., cracking) of a wall of the cast turbine housing that forms the wastegate passage 1259. To remedy such a risk, the wall could be made thicker, however, at the cost of more material and hence more mass. As such, the approach of FIG. 11 can be beneficial as to reduced risk of damage, ease of casting, compactness, etc.

As an example, the sets of vanes 680 and 690 as shown in the example of FIG. 10 may be utilized with a turbine housing having flow passages as in the example of FIG. 11 and/or a turbine housing having flow passages as in the example of FIG. 12. As explained, in the example of FIG. 11, tongues of scrolls may be offset and, in the example of FIG. 12, tongues of scrolls may be aligned.

Figure 13:
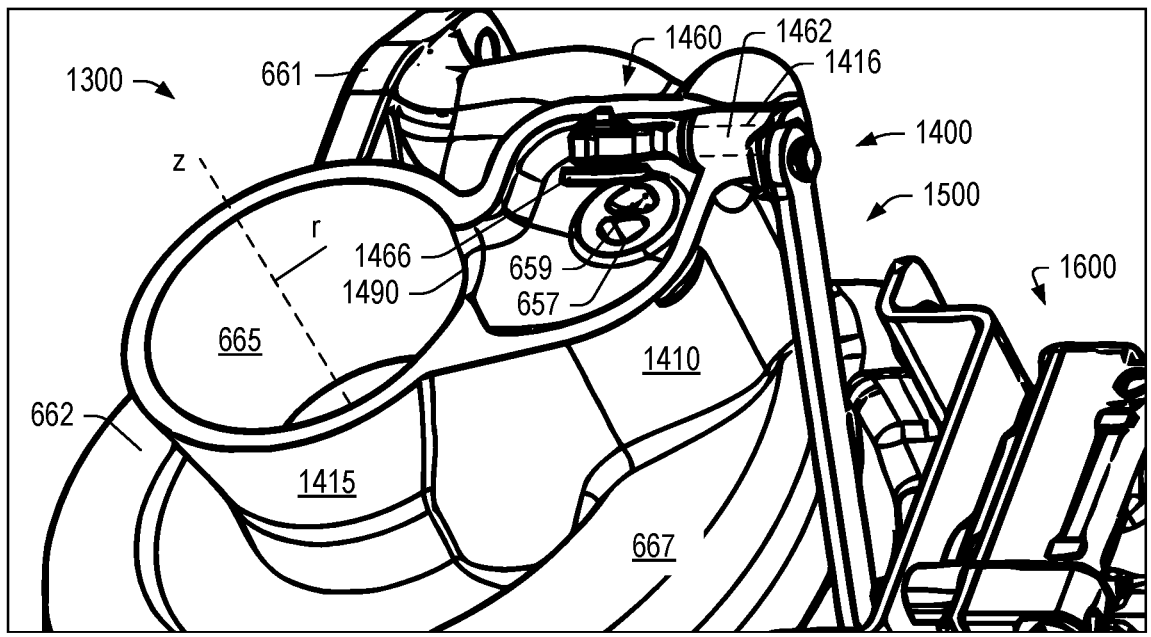
FIG. 13 is a perspective cutaway view of a portion of an example of a turbocharger that shows a wastegate valve in an open position.

FIG. 13 is a perspective cutaway view of a portion of an example of a turbocharger 1300 that shows a wastegate assembly 1400 with a wastegate valve 1460 in an open position where wastegate passages 657 and 659 are visible and in fluid communication with a wastegate outlet 1490 and the outlet passage 665. In such an example, the wastegate assembly 1400 can be utilized to control flow of exhaust gas to a turbine wheel space.

As shown in the example of FIG. 13, the wastegate passages 657 and 659 can be formed within the turbine housing 662 where a portion 1410 of the turbine housing 662 extends axially away from an outer scroll of the passage 667. In such an example, the portion 1410 of the turbine housing 662 forms portions of the wastegate passages 657 and 659 where the portion 1410 can be adjacent to a cylindrical wall portion 1415 of the turbine housing 662 that defines the outlet passage 665 such that the wastegate outlet 1490 can be readily formed as an opening in the cylindrical wall portion 1415 of the turbine housing 662. As shown, the turbine housing 662 can also form a bore 1416 for receipt of a shaft 1462 that is coupled to a plug 1466 that can be positioned to close or open the wastegate passages 657 and 659. As shown, the shaft 1462 can be coupled to a control linkage 1500 that can be coupled to an actuator 1600. For example, consider an electronic or other actuator that can be suitably controlled to cause opening or closing of the plug 1466 of the wastegate valve 1460. As an example, the wastegate passages 657 and 659 may join to form a single outlet that can be covered by the plug 1466 or they may be separate to form two outlets that can be covered by one or more instances of the plug 1466.

As an example, a turbine assembly can include a turbine housing that defines a longitudinal axis and that includes a first scroll and a first tongue at a first angle about the longitudinal axis and a second scroll and a second tongue at a second angle about the longitudinal axis, where an angular span between the first angle and the second angle is greater than 1 degree and less than 180 degrees; and a first set of vanes and a second set of vanes disposed in the turbine housing, where a vane of the first set of vanes is aligned with the first tongue and a vane of the second set of vanes is aligned with the second tongue. In such an example, the turbine assembly can include a seal that seals a space between the turbine housing and the first set of vanes and the second set of vanes. For example, consider a split ring seal (e.g., a piston ring type of seal, etc.).

As an example, a turbine assembly can include a key and keyway anti-rotation feature that hinders rotation of a first set of vanes with respect to a turbine housing, for example, consider a key that is or includes a pin and a keyway that is or includes a pinhole.

As an example, a turbine assembly can include a first and a second set of vanes where the second set of vanes includes one or more keyways for receipt of one or more keys to hinder rotation of the second set of vanes with respect to a center housing coupled to a turbine housing of the turbine assembly.

As an example, a turbine assembly can include a wastegate valve positionable with respect to a wastegate seat. In such an example, a first wastegate passage can be included that is in fluid communication with a first scroll and a second wastegate passage can be included that is in fluid communication with a second scroll where the wastegate valve is positionable with respect to the wastegate seat to control flow of exhaust gas through the first wastegate passage and the second wastegate passage. In such an example, the turbine housing can be a cast turbine housing where the first wastegate passage and the second wastegate passages are interior passages.

As an example, a radial position of a second wastegate passage as measured from a longitudinal axis of a turbine housing can be less than a maximum radial position of a second scroll as measured from the longitudinal axis of the turbine housing. For example, where a first scroll with a first tongue and a second scroll with a second tongue are offset and where the second scroll is positioned axially between the first scroll and a center housing, a wastegate passage in fluid communication with the second scroll can extend axially through a space between azimuthal positions of the first and second tongues rather than having to sweep radially over the first scroll in route to a wastegate seat of a wastegate valve.

As an example, a first scroll of a turbine assembly can be characterized by a first area to radius ratio as measured along a radial line at a first angle and a second scroll of the turbine assembly can be characterized by a second area to radius ratio as measured along a radial line at a second angle, where the first and second angles differ. In such an example, the first angle can correspond to a first tongue position and the second angle can correspond to a second tongue position. As explained, tongues of a twin scroll turbine housing can be offset via an offset angle where two sets of vanes may also be offset via the offset angle.

As an example, a vane of a first set of vanes can be aligned with a first tongue and a vane of a second set of vanes can be aligned with a second tongue where the two vanes are not aligned to reduce high cycle fatigue (HCF) of a turbine assembly.

As an example, a first set of vanes can have fixed vanes and a second set of vanes can have fixed vanes. In such an example, the vanes can be fixed such that they do not pivot. For example, consider vanes fixed between opposing rings where such vanes and rings may optionally be formed from a single piece of material.

As an example, a turbine assembly can include a heat shield for application of a force against a first set of vanes and a second set of vanes to forcibly bias the first set of vanes against a turbine housing. In such an example, the first set of vanes and the second set of vanes can be separable components that contact each other. For example, consider the two sets of vanes as being provided as separate units where one set is positioned followed by positioning of a seal. Once the seal is positioned, then the other set can be positioned to effectively form a slot that can retain the seal. In such an example, the seal can be a seal that hinders mixing of exhaust gas that flows from two scrolls to the sets of vanes where, once the exhaust gas flows through the sets of vanes, it can mix as it enters a turbine wheel space.

As an example, a turbine assembly can include a turbine housing that defines a longitudinal axis and that includes a first scroll and a first tongue at a first angle about the longitudinal axis and a second scroll and a second tongue at a second angle about the longitudinal axis; sets of vanes that include a first set of vanes and a second set of vanes disposed in the turbine housing; and a seal ring disposed between the sets of vanes and the turbine housing, where the seal ring contacts the turbine housing in a space between an outlet of the first scroll and an outlet of the second scroll. In such an example, the first set of vanes and the second set of vanes can be separate units.

As an example, a first set of vanes can be adjustable to align one of its vanes with a first tongue of a first scroll of a turbine housing and a second set of vanes can be adjustable to align one of its vanes with a second tongue of a second scroll of the turbine housing. In such an example, the first tongue and the second tongue can be at a first angle and a second angle, respectively, as measured from a longitudinal axis of the turbine housing that corresponds to a rotational axis of a turbine wheel disposed at least in part in the turbine housing. In such an example, the first angle and the second angle can be aligned or offset. For example, consider alignment of the first and second tongues to correspond to 0 degrees (e.g., no offset or aligned) and consider offset of the first and second tongues to be characterized by an angle between the first and second tongues that is within a range of angles from greater than 0 degrees to less than 360 degrees, optionally to 180 degrees or less than 180 degrees.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine assembly comprising:
a turbine housing that defines a longitudinal axis and that comprises a first scroll and a first tongue at a first angle about the longitudinal axis and a second scroll and a second tongue at a second angle about the longitudinal axis, wherein an angular span between the first angle and the second angle is greater than 1 degree and less than 180 degrees; and
a first set of vanes disposed in the turbine housing at a first axial position of the longitudinal axis and a second set of vanes disposed in the turbine housing at a second axial position of the longitudinal axis, wherein the first axial position and the second axial position differ, and wherein a vane of the first set of vanes is aligned with the first tongue and a vane of the second set of vanes is aligned with the second tongue;

wherein the first set of vanes comprises one or more keyways for receipt of one or more keys to hinder rotation of the first set of vanes with respect to the turbine housing such that the turbine housing with the first set of vanes is rotatable as a first assembled unit;

wherein the second set of vanes comprises one or more keyways for receipt of one or more keys to hinder rotation of the second set of vanes with respect to a center housing such that the center housing with the second set of vanes is rotatable as a second assembled unit; and wherein the turbine housing comprises one or more keyways for receipt of one or more keys upon positional alignment of the turbine housing and the center housing to hinder rotation of the first assembled unit with respect to the second assembled unit.

2. The turbine assembly of claim 1, comprising a seal that seals a space between the turbine housing and the first set of vanes and the second set of vanes.

3. The turbine assembly of claim 2, wherein the seal is a split ring seal.

4. The turbine assembly of claim 1, wherein at least one of the one or more keys comprises a pin and wherein at least one of the one or more keyways comprises a pinhole.

5. The turbine assembly of claim 1, comprising a wastegate valve positionable with respect to a wastegate seat.

6. The turbine assembly of claim 5, comprising a first wastegate passage that is in fluid communication with the first scroll and a second wastegate passage that is in fluid communication with the second scroll where the wastegate valve is positionable with respect to the wastegate seat to control flow of exhaust gas through the first wastegate passage and the second wastegate passage.

7. The turbine assembly of claim 6, wherein the turbine housing is a cast turbine housing and wherein the first wastegate passage and the second wastegate passages are interior passages.

8. The turbine assembly of claim 7, wherein a radial position of the second wastegate passage as measured from the longitudinal axis of the turbine housing is less than a maximum radial position of the second scroll as measured from the longitudinal axis of the turbine housing.

9. The turbine assembly of claim 1, wherein the first scroll is characterized by a first area to radius ratio as measured along a radial line at the first angle and wherein the second scroll is characterized by a second area to radius ratio as measured along a radial line at the second angle.

10. The turbine assembly of claim 1, wherein the vane of the first set of vanes aligned with the first tongue and the vane of the second set of vanes aligned with the second tongue are not aligned with each other to reduce high cycle fatigue of the turbine assembly.

11. The turbine assembly of claim 1, wherein the first set of vanes comprises fixed vanes and wherein the second set of vanes comprises fixed vanes.

12. The turbine assembly of claim 1, comprising a heat shield for application of a force against the first set of vanes and the second set of vanes to forcibly bias the first set of vanes against the turbine housing.

13. The turbine assembly of claim 12, wherein the first set of vanes and the second set of vanes are separable components that contact each other.

14. The turbine assembly of claim 1, wherein the first set of vanes comprises opposing rings, wherein individual vanes of the first set of vanes are at least in part disposed between the opposing rings, and wherein one of the opposing rings comprises the one or more keyways.

15. The turbine assembly of claim 14, wherein the one or more keyways of the one of the opposing rings are one or more pinholes.

16. The turbine assembly of claim 1, wherein the second set of vanes comprises opposing rings, wherein individual vanes of the second set of vanes are at least in part disposed between the opposing rings, and wherein one of the opposing rings comprises the one or more keyways.

17. The turbine assembly of claim 16, wherein the one or more keyways of the one of the opposing rings are one or more pinholes.

18. The turbine assembly of claim 1, wherein the angular span between the first angle and the second angle defines a space for a wastegate passage from the first scroll or the second scroll of the turbine housing to a wastegate valve.

19. An assembly comprising:

a center housing;

a turbine housing that defines a longitudinal axis and that comprises a first scroll and a first tongue at a first angle about the longitudinal axis and a second scroll and a second tongue at a second angle about the longitudinal axis, wherein an angular span between the first angle and the second angle is greater than 1 degree and less than 180 degrees; and a first set of vanes disposed in the turbine housing at a first axial position of the longitudinal axis and a second set of vanes disposed in the turbine housing at a second axial position of the longitudinal axis, wherein the first axial position and the second axial position differ, and wherein a vane of the first set of vanes is aligned with the first tongue and a vane of the second set of vanes is aligned with the second tongue;

wherein the first set of vanes comprises one or more keyways for receipt of one or more keys to hinder rotation of the first set of vanes with respect to the turbine housing such that the turbine housing with the first set of vanes is rotatable as a first assembled unit;

wherein the second set of vanes comprises one or more keyways for receipt of one or more keys to hinder rotation of the second set of vanes with respect to the center housing such that the center housing with the second set of vanes is rotatable as a second assembled unit; and wherein the turbine housing comprises one or more keyways for receipt of one or more keys upon positional alignment of the turbine housing and the center housing to hinder rotation of the first assembled unit with respect to the second assembled unit.

20. An assembly comprising:

a wastegate valve;

a turbine housing that defines a longitudinal axis and that comprises a first scroll and a first tongue at a first angle about the longitudinal axis and a second scroll and a second tongue at a second angle about the longitudinal axis, wherein an angular span between the first angle and the second angle is greater than 1 degree and less than 180 degrees, and wherein the angular span between the first angle and the second angle defines a space for a wastegate passage from the first scroll or the second scroll to the wastegate valve; and a first set of vanes disposed in the turbine housing at a first axial position of the longitudinal axis and a second set of vanes disposed in the turbine housing at a second axial position of the longitudinal axis, wherein the first axial position and the second axial position differ, and wherein a vane of the first set of vanes is aligned with the first tongue and a vane of the second set of vanes is aligned with the second tongue;

wherein the first set of vanes comprises one or more keyways for receipt of one or more keys to hinder rotation of the first set of vanes with respect to the turbine housing such that the turbine housing with the first set of vanes is rotatable as a first assembled unit;

wherein the second set of vanes comprises one or more keyways for receipt of one or more keys to hinder rotation of the second set of vanes with respect to a center housing such that the center housing with the second set of vanes is rotatable as a second assembled unit; and wherein the turbine housing comprises one or more keyways for receipt of one or more keys upon positional alignment of the turbine housing and the center housing to hinder rotation of the first assembled unit with respect to the second assembled unit.

* * * * *